Nov. 14, 1961  C. D. WAYNE ET AL  3,008,281
CONVEYOR
Filed July 14, 1960
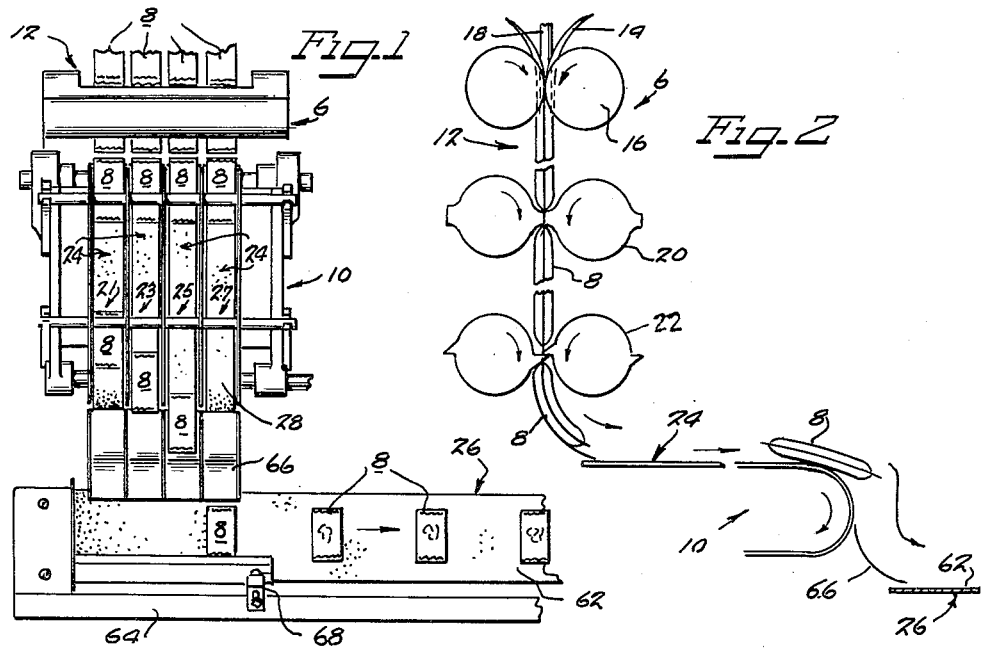
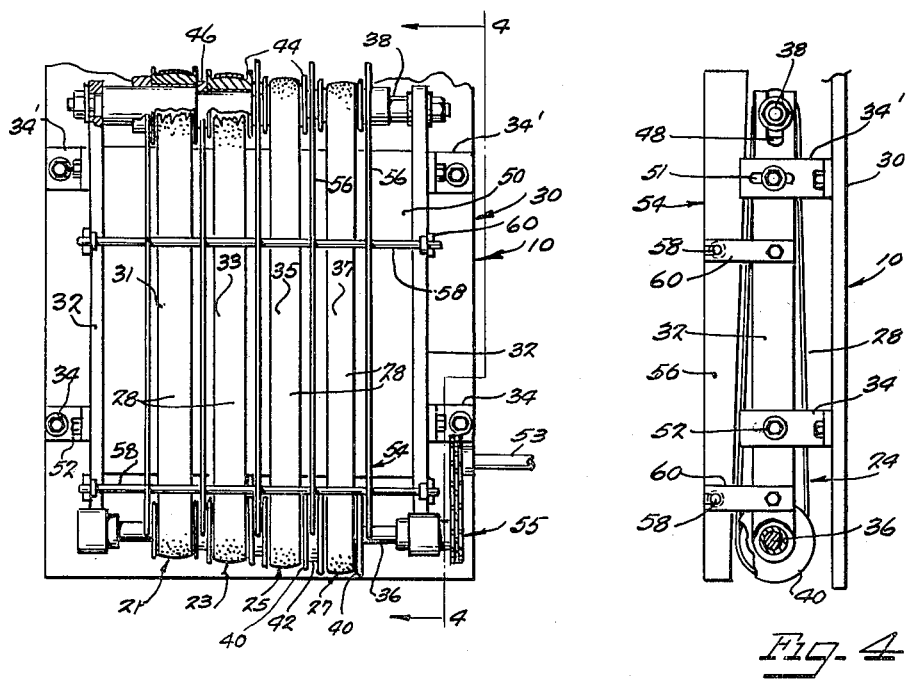
INVENTORS
CLYDE D. WAYNE
CARMEN G. TUMINO
BY
Soans, Anderson, Luedeka & Fitch
ATTYS

United States Patent Office 3,008,281
Patented Nov. 14, 1961

3,008,281
CONVEYOR
Clyde D. Wayne, Wilmette, and Carmen G. Tumino, Elk Grove Village, Ill., assignors to National Dairy Products Corporation, Chicago, Ill., a corporation of Delaware
Filed July 14, 1960, Ser. No. 42,801
4 Claims. (Cl. 53—393)

The present invention relates generally to packaging means and more particularly to a conveyor system for handling packages discharged in groups from a packaging machine.

In the packaging and handling of items on a mass-production basis, an operation may be performed on a batch or group of items requiring them to be in a particular arrangement, but a subsequent operation may be made quite difficult if the items are left in that arrangement. The problem in such a situation is to accomplish a transition with a minimum of effort and, if possible, in conjunction with the necessary transportation of the items between operations. Such a situation has existed in the handling of the batches of individual containers of catsup, dressing, or the like which are periodically discharged from the filler mechanism of packaging machines. As the packages in each batch are discharged simultaneously and side-by-side, causing them to emerge in virtual bunch, it is very difficult to accurately count, separate, or perform similar operations on the containers, and it is generally necessary to handle the packages by hand.

The principal object of the present invention is to provide an improved conveyor system for handling batches of packages discharged from a packaging machine. A more specific object is to provide a conveyor system which will transport and rearrange a batch of such packages from a closely adjacent side-by-side relationship to a spaced-apart relationship.

Further objects and advantages of the present invention will become apparent from the following description and the accompanying drawings.

In the drawings:

FIGURE 1 is a perspective front view of portions of a packaging machine and a conveyor system embodying various features of the present invention, said machine and system shown during their combined operation;

FIGURE 2 is a schematic side view of portions of the packaging machine and conveyor system of FIG. 1, showing the filling, sealing, severing, and handling of packages;

FIGURE 3 is an enlarged and partially broken away plan view of a part of the conveyor system of FIG. 1, particularly showing the parallel varied speed conveyor belts; and FIGURE 4 is a side view taken along line 4—4 of FIG. 3, with parts broken away and in section.

Briefly, the illustrated apparatus embodying the invention comprises a packaging machine 6 for mass-producing individual packages 8, and a conveyor system 10 for periodically receiving a plurality or group of the packages arranged in side-by-side relationship and for transporting and rearranging the package in a group into a spaced-apart relationship so that they can be automatically handled.

FIGURE 2 schematically shows one filler mechanism 12 of the illustrated packaging machine 6 continuously forming filled containers or packages 8 of a fluid or flowable material such as catsup, which packages it periodically discharges onto the conveyor system 10. Briefly, in a continuous operation, flexible packaging material 14 is fed through suitable forming means 16 which form the material into a flat tubular wrap, and a flow of catsup is discharged into the wrap from a dispensing spout 18. Sealing rollers 20 are suitably disposed to periodically seal off the wrap to create a connected series of the individual packages 8, and severing rollers 22 separate the packages thus formed.

In the illustrated machine 6, four filler mechanisms 12 are arranged side-by-side and produce packages 8 as just described. The four mechanisms 12 operate simultaneously, so that periodically the four mechanisms discharge a group of four packages onto the conveyor system 10. The four packages 8 in the group are discharged generally simultaneously in side-by-side relation to one another. While the preferred embodiment is described in terms of the packaging of catsup, obviously, the invention is applicable to the packaging of a variety of products. Also, the specific filler mechanism 12 described may be varied without departing from the scope of the invention, and the specific number of filler mechanisms utilized may be more or less than the four which are shown in the drawings.

Briefly, the conveyor system 10 comprises four parallel varied speed conveyor means designated generally 24, and individually 21, 23, 25, and 27. Each of the conveyor means 24 is positioned to receive a package 8 when it is discharged from a filler mechanism 12 and to convey it away from the filler mechanisms. The speeds of the conveyor means 24 progressively vary, with the conveyor means 21 moving the slowest, the conveyor means 23 moving the next slowest, and the conveyor means 27 moving the fastest. A transverse conveyor means 26 is positioned to receive the packages 8 as they are discharged from varied speed conveyor means 24. The transverse conveyor means 26 runs from the slowest conveyor means 21 toward the fastest conveyor means 27, thus, receiving the packages 8 in spaced-apart alignment which facilitates their being readily counted, sorted, separated or the like.

More particularly, the illustrated parallel varied speed conveyor means 24, shown in detail in FIGS. 3 and 4, comprise four generally horizontal parallel conveyor belts, designated generally 28, and individually 31, 33, 35, and 37. The belts 28 are mounted on the frame 30 of the packaging machine 6, with one end of each belt 28 disposed at the discharge end of one of the filler mechanisms 12. A pair of spaced-apart, parallel, elongated support plates 32 are longitudinally, adjustably supported on the frame 30 by front support brackets 34 and rear support brackets 34'. A driving shaft 36 is rotatably mounted between the plates 32 adjacent two opposed ends, and a second shaft 38 is fixedly secured between the other ends of the plates 32 parallel to the driving shaft 36. Four drive pulleys 40, suitably spaced-apart by separators 42, are fixed to the driving shaft 36. Four driven pulleys 44 are rotatably mounted on the second shaft 38, and are maintained in generally opposed relationship to the drive pulleys 40 by separators 46 fixed to the shaft 38. Each of the four conveyor belts 28 is carried by an opposed pair of pulleys 40 and 44. The shaft 38 is mounted at its opposite ends in a pair of slots 48, as seen best in FIG. 4, to provide for adjusting the spacing between the shafts 36 and 38 and tightening the belts 28, as may be required. A horizontal plate 50 extends between the support plates 32, intermediate the shafts 36 and 38, and is secured adjacent the top edges of the plates 32 so as to underlie the upper runs of the conveyor belts 28. The horizontal plate 50, thus, may give support to the belts 28 intermediate the shafts, and will serve to prevent packages 8 from falling between the belts 28.

Additionally, the apparatus shown in the drawings is provided with guide means 54 which maintains the packages 8 on their respective conveyor belts 28. The illustrated guide means 54 comprise vertical guide plates 56 which extend parallel with the belts 28 and are disposed above said belts. One guide plate 56 is disposed between each pair of belts 28 and one guide plate is disposed outwardly of each end belt. The guide plates 56 are supported and maintained in position by a pair of parallel, spaced-apart, transversely extending rods 58 which are fixed to the plates 56 and themselves supported on vertical brackets 60 secured to the support plates 32. The incline of the conveyor means 24 may be varied somewhat by virtue of the adjustable mounting of the support plates 32 provided by the slots 51 in the rear brackets 34' which permits pivoting of the entire assembly about the attaching bolts 52 on the front brackets 34.

The belts 28 may be driven by any convenient source of power (not shown). In the illustrated apparatus (FIG. 3) power is transmitted from a power shaft 53 through a chain and sprocket drive 55 which rotates the driving shaft 36.

In the illustrated embodiment, the conveyor belts 28 are made to travel at different speeds by varying the diameter of the drive pulleys 40 i.e., as the drive pulleys 40 all rotate at the same speed, the larger the diameter of a pulley, the faster the associated belt 28 travels. Accordingly, progressing from left to right in FIG. 3, the drive pulleys 40 are made progressively larger, producing a progressive speed variation between the belts 31, 33, 35, and 37, i.e., belt 31 going the slowest and belt 37 going the fastest.

The illustrated transverse conveyor means 26 comprises a generally horizontal, transverse conveyor belt 62 rotatably mounted on a frame 64 at the discharge end of the belts 28 and driven by suitable power means (not shown). The transverse belt 62 moves from the slowest belt 31 toward the fastest belt 37. With the transverse belt 62 continuously running in this direction, it operates to carry packages 8 discharged by the faster belts 28 away from the slower belts before the latter discharge their packages, and, thus, creates the desired spacing-apart of the packages. For example, when the fastest belt 37 discharges its package on the transverse belt 62, time will elapse before the next fastest belt 35 is ready to discharge its package. During the time period, the package discharged by the fastest belt 37 has moved away from belt 35 on the transverse belt 62. When belt 35 then discharges its package on belt 62 the desired spacing has been achieved between the two packages. By varying the speeds of the conveyor means 24 and 26, the spacing of the packages 8 on the transverse belt 62 may be controlled.

Appropriate discharge chutes 66 may be provided, as shown in the drawings, to facilitate the movement of the packages 8 from the varied speed conveyor belts 28 to the transverse belt 62. Also, an adjustable shield or stop 68, such as shown in FIG. 1, may be provided to selectively position the packages 8 in alignment on the transverse conveyor belt 62 as they are discharged onto it.

Thus, a device is provided which continuously and automatically transports and spaces-apart batches of packages discharged from a packaging machine. As pointed out above, if the packages 8 were discharged directly onto the transverse conveyor belt 62 they would be bunched together or at least in very close proximity to one another, making automatic counting and various other automatic operations extremely difficult. The progressively different speeds of the varied speed belts 28, however, creates a timed interval between the discharge of packages from adjacent belts 28 and, as the transverse belt 62 runs continuously and at a uniform speed, the packages are spaced-apart a predetermined distance along the length of that belt 62, greatly facilitating such automatic operations.

The preferred embodiment herein described may be varied without departing from the scope of the invention. For example, there are many other ways of producing the varied speeds of the parallel conveyors, such as by the use of gearing, and such other ways are obviously within the scope of the invention.

Various features of the present invention are set forth in the following claims.

We claim:

1. For use with a packaging machine wherein a plurality of filler mechanisms are positioned to simultaneously charge a plurality of containers arranged side-by-side for movement in laterally aligned relation away from the filler mechanisms, a conveyor system comprising a plurality of parallel conveyors underlying, respectively, each of the filler mechanisms in position to move the filled containers away from the filler mechanism, means for moving said parallel conveyors at different rates of speed such that the speed of said conveyors is progressively greater from one to the next adjacent of said parallel conveyors, and an additional conveyor disposed in generally transverse relation to said parallel conveyors adjacent the discharge end of the latter and moving in a direction from the slower to the fastest moving parallel conveyor, whereby the filled containers generally simultaneously leaving the filler mechanisms in side-by-side alignment are deposited on said additional conveyor in spaced-apart relation therealong.

2. For use with a packaging machine wherein a plurality of filler mechanisms are adapted to continuously and simultaneously operate to periodically charge and discharge a plurality of containers arranged side-by-side for movement in laterally aligned relation away from the filler mechanisms, said filler mechanisms simultaneously discharging the filled containers comprising said plurality of containers, a conveyor system comprising a plurality of parallel conveyors underlying, respectively, each of the filler mechanisms in position to move said filler containers away from the mechanisms, means for continuously moving said parallel conveyors at different rates of speed such that the speed of said conveyors is progressively greater from one to the next adjacent of said parallel conveyors, and an additional conveyor disposed in generally transverse relation to said parallel conveyors adjacent the discharge end of the latter and continuously moving in a direction from the slower to the fastest moving parallel conveyor, whereby in a repeating operation filler containers leaving the filler mechanisms simultaneously and arranged side-by-side are deposited on said additional conveyor in spaced-apart relation therealong.

3. In combination with a packaging machine comprising a plurality of filler mechanisms arranged side-by-side for simultaneously charging a plurality of containers, each of said filler mechanisms including a dispensing spout, means for forming a generally tubular container of flexible sheet material over each of said spouts for movement downwardly therefrom as the tubular container is being filled, means for sealing and severing each of said tubular containers at predetermined spacings therealong to provide individual filled containers, a conveyor system for handling said individual filler containers comprising a plurality of parallel conveyors underlying, respectively, each of the filler mechanisms at a position below said sealing and severing means, means for moving all of said parallel conveyors with the speed of each of said conveyors being progressively greater from one side to the other of said packaging machine, and an additional conveyor disposed in generally transverse relation to said parallel conveyors adjacent the discharge end of the latter, means for moving said additional conveyor in a direction from the slower moving conveyor past the faster moving of said parallel conveyors, whereby the individual containers which are generally simultaneously deposited on said parallel conveyors are subsequently deposited on said additional conveyor in spaced-apart relation wherein the spacing of the containers on said additional conveyor is substantially greater than the lateral spacing of said parallel conveyors.

4. In combination with a packaging machine comprising a plurality of filler mechanisms arranged side-by-side for continuously and simultaneously operating to periodically charge and then discharge a plurality of containers, each of said filler mechanisms including a dispensing spout, means for forming a generally tubular container of flexible sheet material over each of said spouts for movement downwardly therefrom as the tubular container is being filled, means for sealing and severing each of said tubular containers at predetermined spacings therealong to provide individual filled containers, said filler mechanisms simultaneously discharging the filled containers comprising said plurality of containers, a conveyor system for handling said individual filled containers comprising a plurality of parallel conveyors underlying, respectively, each of the filler mechanisms at a position below said sealing and severing means, means for continuously moving all of said parallel conveyors with the speed of each of said conveyors being progressively greater from one side to the other of said packaging machine, and an additional conveyor disposed in generally transverse relation to said parallel conveyors adjacent the discharge end of the latter, means for continuously moving said additional conveyor in a direction from the slower moving conveyor past the faster moving of said parallel conveyors, whereby individual containers deposited simultaneously and side-by-side on said parallel conveyors are subsequently deposited on said additional conveyor in spaced-apart relation wherein the spacing of the containers on said additional conveyor is substantially greater than the lateral spacing of said parallel conveyors.

References Cited in the file of this patent
UNITED STATES PATENTS 2,389,696     Stiles _____ Nov. 27, 1945